Aug. 30, 1927.

P. CARLSON 1,641,115

CAB FOR MOTOR VEHICLES

Filed Jan. 21, 1927

INVENTOR.
Philip Carlson
BY G. H. Braddock
ATTORNEY

Patented Aug. 30, 1927.

1,641,115

UNITED STATES PATENT OFFICE.

PHILIP CARLSON, OF BRIDGEPORT, CONNECTICUT.

CAB FOR MOTOR VEHICLES.

Application filed January 21, 1927. Serial No. 162,629.

This invention relates to a cab for a truck or the like, and an object of the invention is to provide a cab having a novel and improved assembly of cab roof and top with wind shield structure.

An ordinary truck cab of commerce includes a cab roof or top rigidly associated with a wind shield structure, both the roof or top and wind shield structure being an integral part of a cab frame rigidly supported upon the chassis frame of a vehicle, which chassis frame is subjected to considerable weaving or warping under heavy loads and over rough ground, as is well known. Naturally, the twisting movement to which the chassis frame is subjected is communicated through the cab frame to the cab roof or top and wind shield structure to cause said roof or top and structure to have severe twisting strains relatively to each other, such strains having tendency to cause the cab roof or top, as well as the wind shield structure and the wind shield, to be broken or otherwise harmed.

A more specific object of the invention is to provide a cab having roof or top and wind shield structure which are rigidly supported upon the cab frame and are connected with each other in novel and improved fashion allowing relative sidewise and resiliently limited to and fro movements between said roof or top and wind shield structure, whereby twisting or weaving strains communicated to said cab roof or top are not transmitted to said wind shield structure, and vice versa.

A further specific object is to produce a cab having roof or top and wind shield structure connected to have sidewise and resiliently limited to and fro movements relatively to each other in a manner to provide a permanent and dependable closure between said roof or top and wind shield structure.

A further specific object is to provide simple, novel and improved mechanism for connecting a cab roof or top and wind shield structure, both rigidly supported upon a cab frame, which mechanism will allow sidewise and resiliently limited to and fro movements of said roof or top and wind shield structure relatively to each other to preclude the possibility of twisting or weaving strains communicated to said cab roof or top being transmitted to said wind shield structure, and vice versa.

A further specific object is to produce simple, novel and improved mechanism for connecting a cab roof or top and wind shield structure, both rigidly supported upon a cab frame, which mechanism will provide a permanent and dependable closure between said roof or top and wind shield structure, and will allow sidewise and resiliently limited to and fro movements of said roof or top and wind shield structure relatively to each other to preclude the possibility of twisting or weaving strains communicated to said cab roof or top being transmitted to said wind shield structure, and vice versa.

A further specific object is to incorporate in the mechanism as briefly described, practical and dependable features and characteristics of construction designed to render the cab an improvement generally over cabs heretofore known.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the appended claims.

In the accompanying drawing forming a part of this specification,

Figure 1:
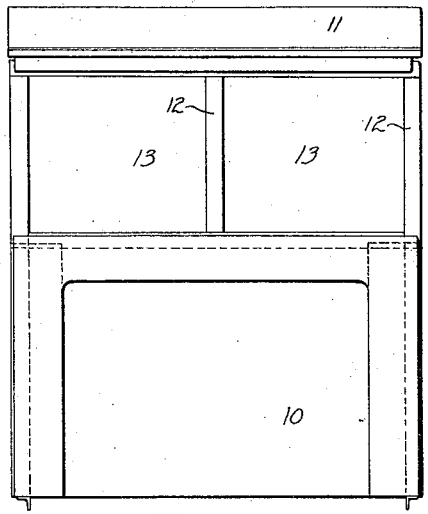
Fig. 1 is a front elevational view of a cab for trucks having the features of the invention.
Figure 2:
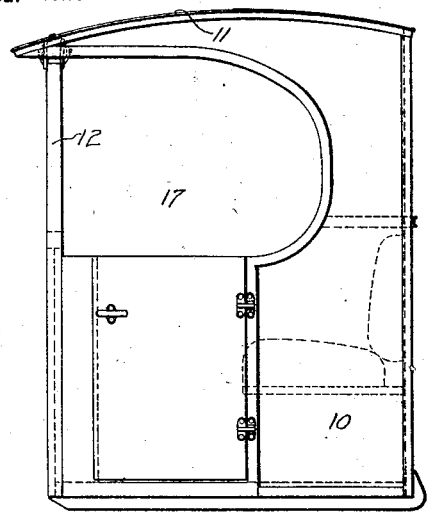
Fig. 2 is a side elevational view of the cab.
Figure 3:
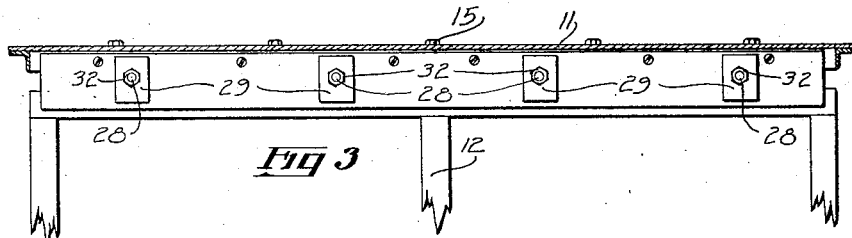
Fig. 3 is an enlarged, fragmentary, vertical, transverse sectional view of the cab roof or top, disclosing the wind shield structure and the improved mechanism for connecting said roof or top and wind shield structure in elevation.
Figure 4:
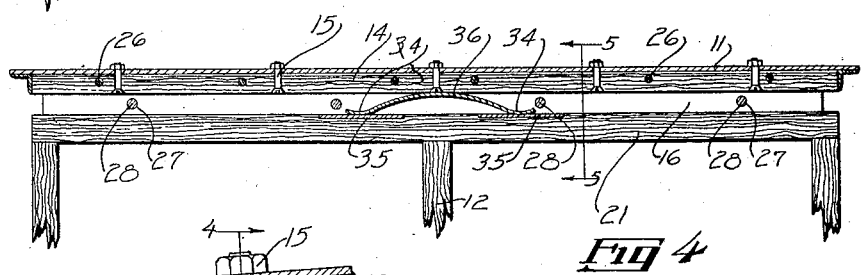
Fig. 4 is a fragmentary, vertical, transverse sectional view, on the scale of Fig. 3 and as on line 4—4 in Fig. 5, of the cab roof or top and the wind shield structure, disclosing the improved mechanism for connecting said roof or top and wind shield structure in vertical, longitudinal section.
Figure 5:
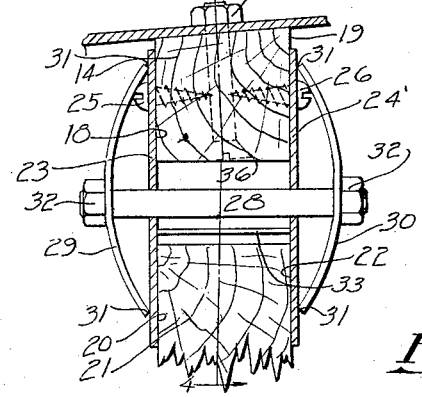
Fig. 5 is a further enlarged fragmentary sectional view as on line 5—5 in Fig. 4.

With respect to the drawing and the numerals of reference thereon, 10 denotes a cab having a roof or top 11 and a wind shield structure 12 with wind shields 13. The forward portion of the cab roof or top 11 extends approximately horizontally forwardly across the upper portion of the vertical wind shield structure 12, and is provided with a transverse beam 14 secured to the roof or top as at 15, said beam 14 being directly above said wind shield structure, in spaced relation thereto to provide the transverse space, indicated 16, between said beam and wind shield structure. The upper end of the wind shield structure terminates, as disclosed, in a horizontal surface, and the lower surface of the transverse beam 14 is also horizontal. See Figs. 3, 4 and 5. 17 are the usual side openings in the frame beneath the forward portion of the cab top and at the rear of the wind shield structure.

The forward and rearward surfaces, denoted 18 and 19, respectively, of the transverse beam 14 are flat and are disposed in vertical planes extending transversely of the cab frame, the surface 18 being in the same plane as the forward, vertically disposed surface 20 of the upper transverse member 21 of the wind shield structure, and the surface 19 being in the same plane as the rearward, vertically disposed surface 22 of said transverse member 21. See Fig. 5.

Numerals 23 and 24 represent forward and rearward closure strips, of metal or other substantial material, extending transversely approximately the width of the cab frame, the closure strip 23 being rigidly secured as at 25 to the surface 18 of the transverse beam 14 and distending across the space 16 to lap the surface 20 of the transverse member 21 and lie snugly against said surface 20, and the closure strip 24 being rigidly secured as at 26 to the surface 19 of said transverse beam and distending across said space 16 to lap the surface 22 of said transverse member and lie snugly against said surface 22. See Figs. 3 and 5. While the closure strips 23 and 24 snugly engage considerable portions of the widths of the surfaces 20 and 22, respectively, of the transverse member 21 of the wind shield structure to provide a permanent and dependable closure for the space 16 between the transverse beam 14 of the cab roof or top and the transverse member 21 of the wind shield structure, said closure strips 23 and 24 are not attached or secured to said transverse member 21, and do not, therefore, preclude sidewise and to and fro movements of the cab roof or top and wind shield structure relatively to each other, as will be apparent.

Numeral 27 represents aligning openings in the closure strips 23 and 24 at spaced intervals along said closure strips at approximately the elevation corresponding with the midwidth of the space 16. Each set of aligning openings 27 receives a bolt 28 carrying a leaf spring 29 at one of its end portions adapted to engage the closure strip 23, and a leaf spring 30 at its other end portion adapted to engage the closure strip 24. The leaf springs 29 and 30 are bowed outwardly from the closure strips, the openings 27 are at about the midlengths of said leaf springs, and each leaf spring has flat side edges 31 adapted to engage said closure strips, including a side edge at the elevation of the transverse beam 14 and a side edge at the elevation of the transverse member 21. A nut 32 adjustable upon a threaded part at each end of the bolt 28 and outside of the bowed parts of the leaf springs serves the purpose of tightening said leaf springs 29 and 30 down against the closure strips. See Figs. 3, 4 and 5. The purpose of the leaf springs 29 and 30 and the bolt and nut structure securing said leaf springs against the closure strips is to render the position of the closure strips 23 and 24 resiliently stable with respect to the transverse beam 14 and the transverse member 21.

A transversely disposed leaf spring 33, within the space 16 at about the midwidth of the cab frame, has end portions 34 resting with pressure upon inserted metallic pieces 35 upon the upper face of the transverse member 21, and an upwardly bowed central portion 36 in pressing engagement with the lower face of the transverse beam 14. See Figs. 4 and 5.

The cab frame 10 is adapted to be rigidly supported upon the chassis frame of a vehicle. When the vehicle is subjected to weaving or warping, as when under heavy loads, or on rough ground, twisting movements communicated through the cab frame to the roof or top cannot be imparted to the wind shield structure, by reason of lack of a positive connection between said roof or top and wind shield structure. Likewise, twisting movements communicated to said wind shield structure cannot be imparted to said roof or top. The closure strips 23 and 24 will allow the cab roof or top and the wind shield structure to have movements transversely of the cab frame and to and fro movements relatively to each other. At the same time, said closure strips 23 and 24 effectively cover the space 16 between the transverse beam 14 upon the roof or top and the transverse member 21 of the wind shield structure, being rigidly secured to the transverse beam and securely and resiliently pressed against said transverse beam and transverse member 21 in lapping relation with each by the leaf springs 29 and 30. The to and fro movements of the cab roof or top and wind shield structure relatively to each other allowed by the closure strips 29 and 30 are, obviously, resisted by the leaf spring 33 situated within the space 16 and engaging the transverse beam and transverse member under pressure as set forth. The leaf spring 33 is of structure to allow resiliently limited relative to and fro movements between said cab roof or top and wind shield structure.

It is evident that all or any part of the space 16 between the transverse beam 14 and the transverse member 21 can be packed with grease adapted to diminish friction between the surfaces 20 and 22 of the member 21 and the closure strips 23 and 24.

What I claim is:

1. A cab comprising a cab frame including a roof member, a wind shield structure member upon said frame and beneath said roof member, said members being rigid with the frame, and a connection between said members to preclude the transmission to said wind shield structure of twisting strains imparted to said roof, and vice versa, said connection including closure strips secured to one of said members and engaging the other member in a manner to allow sidewise movements of said members relatively to each other.

2. A cab comprising a cab frame including a roof member, a wind shield structure member upon said frame and beneath said roof member, said members being rigid with the frame, and a connection between said members including closure strips secured to one of said members and engaging the other member in a manner to allow sidewise movements of said members relatively to each other, and a resilient element between said members to allow resiliently limited to and fro movements of said members relatively to each other.

3. A cab comprising a cab frame including a roof member, a wind shield structure member upon said frame and beneath said roof member, said member being rigid with the frame, and a connection between said members including closure strips secured to opposite faces of one of said members and engaging opposite faces of the other member in a manner to allow sidewise movements of said members relatively to each other, and a resilient element between adjacent faces of said members to allow resiliently limited to and fro movements of said members relatively to each other.

4. A cab comprising a cab frame including a roof member, a wind shield structure member upon said frame and beneath said roof member, said members being rigid with the frame, and a connection between said members including closure strips of substantial material secured to opposite faces of one of said members and lapping and engaging opposite faces of the other member, spaced apart resilient means engaging said closure strips to press them against said members, and a flexible element between adjacent faces of said members bearing with pressure against each member.

5. A cab comprising a cab frame adapted to be positioned upon the chassis frame of a vehicle, the cab frame including an integral top member, a wind shield structure member integral with said cab frame and beneath said top member, and a connection between said top member and wind shield structure member including closure strips engaging opposite faces of both of said members, and means resiliently pressing said closure strips against one of said members.

6. A cab comprising a cab frame adapted to be positioned upon the chassis frame of a vehicle, the cab frame including an integral top member, a wind shield structure member integral with said cab frame and beneath said top member, and a connection between said top member and wind shield structure member including closure strips engaging opposite faces of both of said members, means resiliently pressing said closure strips against one of said members, and a resilient element between adjacent faces of said members bearing with pressure against each member.

7. A cab comprising a cab frame adapted to be positioned upon the chassis frame of a vehicle, the cab frame including an integral top member, a wind shield structure member integral with said cab frame and beneath the top member, there being a space between said members, and a connection between said top member and wind shield structure member including closure strips engaging opposite faces of both of said members and extending across said space, means resiliently pressing said closure strips against one of said members, and a resilient element between adjacent faces of said members.

Signed at Bridgeport, in the county of Fairfield, and State of Connecticut, this 16th day of December, A. D. 1926.

PHILIP CARLSON.